US011473181B2

(12) United States Patent
Kim et al.

(10) Patent No.: US 11,473,181 B2
(45) Date of Patent: Oct. 18, 2022

(54) YITTRIUM GRANULAR POWDER FOR THERMAL SPRAY AND THERMAL SPRAY COATING PRODUCED USING THE SAME

(71) Applicant: KOMICO LTD., Anseong-si (KR)

(72) Inventors: Dae Sung Kim, Anseong-si (KR); Seong Sik Bang, Anseong-si (KR); Jae Im Jeong, Anseong-si (KR); Dong Hun Jeong, Anseong-si (KR)

(73) Assignee: KOMICO LTD., Anseong-si (KR)

( * ) Notice: Subject to any disclaimer, the term of this patent is extended or adjusted under 35 U.S.C. 154(b) by 0 days.

(21) Appl. No.: 17/401,145

(22) Filed: Aug. 12, 2021

(65) Prior Publication Data
US 2022/0186353 A1     Jun. 16, 2022

(30) Foreign Application Priority Data

Dec. 10, 2020  (KR) .................. 10-2020-0172722

(51) Int. Cl.
*C04B 35/505* (2006.01)
*C23C 4/11* (2016.01)
*C04B 35/626* (2006.01)

(52) U.S. Cl.
CPC .............. *C23C 4/11* (2016.01); *C04B 35/505* (2013.01); *C04B 35/62675* (2013.01); *C04B 2235/3225* (2013.01); *C04B 2235/428* (2013.01)

(58) Field of Classification Search
CPC .............. C23C 4/11; C04B 35/505; C04B 35/62675; C04B 2235/3225; C04B 2235/428
See application file for complete search history.

(56) References Cited

U.S. PATENT DOCUMENTS

| | | | | |
|---|---|---|---|---|
| 7,569,280 B2* | 8/2009 | Hayasaki | .............. | C23C 14/083 428/469 |
| 7,833,924 B2* | 11/2010 | Kobayashi | .......... | C04B 35/6261 501/152 |
| 9,528,176 B2* | 12/2016 | Mizuno | ..................... | C23C 4/08 |
| 2006/0110609 A1* | 5/2006 | Eaton | ..................... | F01D 5/288 428/446 |
| 2013/0273313 A1* | 10/2013 | Sun | ......................... | C23C 4/01 428/137 |

FOREIGN PATENT DOCUMENTS

| KR | 20050013968 A | 2/2005 |
|---|---|---|
| KR | 20080083600 A | 9/2008 |
| KR | 20140076588 A | 6/2014 |
| KR | 20160131918 A | 11/2016 |

OTHER PUBLICATIONS

Garcia et al. The Prospect of Y2SiO5-Based Materials as Protective Layer in Environmental Barrier Coatings. Journal of Thermal Spray Technology. 680—vol. 22(5) p. 680-689. Jun. 2013.*

* cited by examiner

*Primary Examiner* — Noah S Wiese
(74) *Attorney, Agent, or Firm* — STIP Law Group, LLC (57) ABSTRACT

The present disclosure relates to an yttrium-based granular powder for thermal spraying. More particularly, the yttrium-based granular powder is a mixture including one or more yttrium compound powders selected from among Y2O3, YOF, YF3, Y4Al2O9, Y3Al5O12, and YAlO3, and a silica (SiO$_2$) powder. A Y—Si—O intermediate phase is included therein in a content of less than 10 wt %. The thermal spray coating manufactured using the same has a low porosity, and forms a very dense thin film, thus ensuring excellent plasma resistance.

5 Claims, 3 Drawing Sheets

YITTRIUM GRANULAR POWDER FOR THERMAL SPRAY AND THERMAL SPRAY COATING PRODUCED USING THE SAME

CROSS-REFERENCE TO RELATED APPLICATIONS

This application claims the priority of the Korean Patent Applications NO 10-2020-0172722 filed on Dec. 10, 2020, in the Korean Intellectual Property Office, the disclosure of which is incorporated herein by reference.

BACKGROUND OF THE DISCLOSURE

1. Field of the Disclosure

The present disclosure relates to an yttrium-based granular powder for thermal spraying containing a silica component, and a high-density thermal spray coating using the same.

2. Description of the Related Art

In a process of manufacturing a semiconductor, a plasma dry etching process for the purpose of performing microfabrication for high integration of substrate circuits such as silicon wafers is becoming increasingly important.

For the purpose of use in such an environment, methods to apply materials having excellent plasma resistance to a chamber member or methods to increase the life of the member by coating the surface of the member with a material having excellent plasma resistance have been proposed.

Among them, technologies for imparting new functionality by coating the surface of a substrate with various materials have been conventionally used in various fields. As one of the surface coating technologies, for example, a thermal spraying method is known, in which thermal spray particles including a material such as ceramics are sprayed on the surface of a substrate in a softened or molten state using combustion or electric energy to form a thermal spray coating.

In general, thermal spray coating is performed by heating and melting fine powders and spraying the molten powders toward the surface of a mother material to be coated. As the sprayed molten powder is rapidly cooled, the molten powder is solidified and layered on the coating target surface mainly by mechanical bonding force.

Among the thermal spray coatings, plasma spray coating in which powder is melted using a high-temperature plasma flame is essentially used for coating metals such as tungsten or molybdenum having a high melting point and ceramics. The thermal spray coating is useful to produce high-functional materials that exhibit the characteristics of abrasion resistance, corrosion resistance, heat resistance, thermal barrier, carbide, oxidation resistance, insulation, friction characteristics, heat dissipation, and biological function radiation resistance by taking advantage of the material characteristics of a mother material. Further, in the thermal spray coating, it is possible to coat a large-area object in a short time compared to other coating methods such as chemical vapor deposition or physical vapor deposition.

In addition, in the field of manufacturing semiconductor devices, microfabrication is generally performed over the surface of a semiconductor substrate by dry etching using plasma of a halogen-based gas such as fluorine, chlorine, or bromine. Further, after the dry etching, the inside of the chamber (vacuum container) from which the semiconductor substrate is taken out is cleaned using oxygen gas plasma. In the chamber, there is a possibility that the member exposed to the highly reactive oxygen gas plasma or halogen gas plasma is corroded. In addition, when a corroded (eroded) portion is separated in the form of particles from the member, these particles may be foreign matter (hereinafter, this foreign matter is referred to as particle) that adheres to the semiconductor substrate and thus causes a defect in the circuit.

Therefore, conventionally, in an apparatus for manufacturing a semiconductor device, a thermal spray coating of ceramic having plasma erosion resistance is provided on a member exposed to plasma of oxygen gas or halogen gas for the purpose of reducing the generation of particles.

The generation of the particles may be caused by the peeling of the reaction product adhering to the vacuum chamber, and by deterioration of the chamber due to the use of a halogen gas plasma or oxygen gas plasma. Further, according to the review of the present inventors, it is known that the number or size of particles generated from the thermal spray coating in a dry-etching environment depends on the strength of the bonding force between the particles constituting the thermal spray coating, the presence of unmelted particles, or high porosity.

In particular, as the density of the coating inside of the thermal spray coating of ceramics is increased, the degree of adsorption of CFx-based process gases may be reduced due to defects such as pores in the dry etching process, thus reducing the etching caused by plasma ion collision.

In general, as a coating method for forming a high-density thermal spray coating, there is a suspension plasma spraying method (SPS), an aerosol deposition method (AD), or a physical vapor deposition method (PVD). All of these three methods have drawbacks in that the manufacturing method is complicated and the manufacturing cost is high compared to a conventional atmospheric plasma spraying method (APS).

In the case of the suspension plasma spraying method (SPS) technology, a relatively high heat source causes problems such as product deformation due to a high process temperature during coating in a semiconductor chamber. As the particle size is reduced, the particle flight distance becomes shorter, and thus the working distance between plasma equipment and the substrate to be coated is shortened, which partially limits the work. Further, in the SPS technology, when a suspension in which water and particles are dispersed is injected in the same volume, the film formation rate of the coating is low, and thus additional processing time is required, resulting in high manufacturing cost.

Further, aerosol deposition (AD) and physical vapor deposition (PVD) methods are technically limited to achieve a coating thickness of several hundred μm, and in actual coating, the coating operation is limited with respect to substrates having complex shapes.

Accordingly, there is a need to develop a technology capable of implementing a high-density thermal spray coating using the conventional atmospheric plasma spraying method (APS).

In the case of the particles of the thermal spray material used in a typical APS method, primary powder particles of several μm come together to form granular powder of 20 to 40 μm. A method of forming the primary powder constituting the thermal spray material so as to have a small size of 1 μm or less to thus increase the density of the thermal spray coating has been proposed.

However, in the case of the above method, as the specific surface area of the thermal spray material is increased, since heat is not uniformly transferred to the primary powder in the granular powder, a coat in an unmelted or remelted state is formed on the surface of the thermal spray coating or in the thermal spray coating, which acts as a cause of particle generation in the dry etching process.

Further, when the size of the secondary particles forming the granular powder is very small, the powders are agglomerated due to the electrostatic attraction among the granular powders, making it difficult to actually perform transportation in the atmosphere, or it is highly likely that after the transportation of granular powder, the granular powder will not be transported to the central frame but will be scattered elsewhere due to the low mass thereof.

As a conventional technology, Korean Laid-Open Patent Application No. 10-2016-0131918 (2016 Nov. 16) discloses that the material for thermal spraying contains rare earth element oxyhalides (RE-O—X) containing rare earth elements (RE), oxygen (O), and halogen elements (X) as constituent elements, and a molar ratio (X/RE) of the halogen element to the rare earth element is 1.1 or more, thereby improving plasma resistance and properties such as porosity and hardness.

Further, Korean Laid-Open Patent Application No. 10-2005-0013968 (2005 Feb. 5) discloses a plasma-resistant member containing 100 to 1000 ppm of a silicon element in an yttria coating layer. However, since the yttria coating layer containing the silicon element contains a semiconductor component, there is a risk of arcing due to the electrical properties imparted thereto. Since the basic color thereof is black, it is indistinguishable from contaminants in a semiconductor process, so there is a high risk of adding unnecessary cleaning processes due to confusion when a chamber is cleaned.

As described above, technologies for mixing and manufacturing yttrium oxide and yttrium fluoride to manufacture yttrium oxyfluoride thermal spray materials having improved physical properties such as plasma erosion, porosity, and hardness have been proposed till lately in order to overcome the limitations of physical properties of yttrium oxide or yttrium fluoride thermal spray materials. However, nevertheless, the demand for the development of technologies for manufacturing a dense thermal spray coating for improving plasma resistance and granular powder for thermal spraying for manufacturing the same is continuously required from an industrial point of view.

RELATED ART DOCUMENT

Patent Document (Patent Document 0001) Korean Patent Application Publication No. 10-2016-0131918 (Nov. 16, 2016)

(Patent Document 0002) Korean Patent Application Publication No. 10-2005-0013968 (Feb. 5, 2005)

SUMMARY OF THE DISCLOSURE

Accordingly, the present disclosure has been made keeping in mind the above problems occurring in the prior art, and a main objective of the present disclosure is to provide a granular powder for thermal spraying including a silica powder in an yttrium compound powder. The melting point of the yttrium-based compound is reduced to suppress the formation of pores in a thermal spray coating during a process of manufacturing the thermal spray coating, and some of silica is lost during the process of the thermal spray coating due to the boiling point of silica that is lower than the boiling point of the yttrium-based compound, thereby manufacturing a dense yttrium-based thermal spray coating.

In order to accomplish the above objective, an embodiment of the present disclosure provides an yttrium-based granular powder for thermal spraying, which include one or more yttrium compound powders selected from among Y2O3, YOF, YF3, Y4Al2O9, Y3Al5O12, and YAlO3, and a silica ($SiO_2$) powder. A Y—Si—O intermediate phase is included in a content of less than 10 wt %.

In a preferred embodiment of the present disclosure, the size of the granular powder may be 5 to 50 μm.

In a preferred embodiment of the present disclosure, a weight ratio (Si/Y) of a silicon element to yttrium may be 0.3 to 1.00.

In a preferred embodiment of the present disclosure, 90 to 99.9 mass % of the yttrium compound powder having an average diameter of 0.1 to 10 μm may be mixed with 0.1 to 10 mass % of the silica powder having an average diameter of 0.1 to 10 μm to manufacture the granular powder.

Another preferred embodiment of the present disclosure provides a method of manufacturing an yttrium-based granular powder for thermal spraying. The method includes (a) mixing one or more yttrium compound powders selected from among Y2O3, YOF, YF3, Y4Al2O9, Y3Al5O12, and YAlO3 with a silica ($SiO_2$) powder to manufacture a mixture, (b) assembling the mixture to manufacture the granular powder, and (c) calcining the granular powder at 1200 to 1450° C. to obtain the yttrium-based granular powder for thermal spraying. The yttrium-based granular powder for thermal spraying includes a Y—Si—O intermediate phase in a content of less than 10 wt %.

Another preferred embodiment of the present disclosure provides yttrium-based particles for thermal spraying manufactured using the method of manufacturing the yttrium-based particles for thermal spraying.

Another preferred embodiment of the present disclosure provides a method of manufacturing the yttrium-based thermal spray coating, in which a silicon element is partially vaporized during a process of manufacturing the thermal spray coating.

A thermal spray coating manufactured from an yttrium-based granular powder for thermal spraying containing a silica component according to the present disclosure has a very high density at an inside thereof, so an etching rate by a process gas is reduced in a dry etching process. Accordingly, the thermal spray coating has excellent durability when used as a coating material for a member in a semiconductor chamber. Further, a phenomenon in which the coating material is detached due to an etching phenomenon is suppressed, thereby contributing to the improvement of the yield of semiconductor wafers.

BRIEF DESCRIPTION OF THE DRAWINGS

The above and other objects, features and advantages of the present disclosure will be more clearly understood from the following detailed description taken in conjunction with the accompanying drawings, in which:

FIG. 1A, FIG. 1B are a scanning electron microscope (SEM) photograph of yttria granular powders for thermal spraying according to (a) Preparation Example 1 and (b) Preparation Example 2 according to the present disclosure;

FIG. 2A, FIG. 2B, FIG. 2C and FIG. 2D are a scanning electron microscope (SEM) photograph of sides of thermal spray coatings according to (a) Example 1, (b) Example 2, (c) Example 3, and (d) Example 4 according to the present disclosure; and FIG. 3A, FIG. 3B, FIG. 3C

DESCRIPTION OF THE PREFERRED EMBODIMENTS

Unless defined otherwise, all technical and scientific terms used in the present specification have the same meaning as commonly understood by one of ordinary skill in the art to which this disclosure belongs. In general, the nomenclature used in the present specification is well known and commonly used in the art.

Throughout this specification, when a part is said to "include" a certain component, this means that other components may be further included without excluding other components unless otherwise stated.

In a process of manufacturing a semiconductor, a gate etching apparatus, an insulating film etching apparatus, a resist film etching apparatus, a sputtering apparatus, and a CVD apparatus are used. Meanwhile, in a process of manufacturing a liquid crystal, an etching apparatus for forming a thin film transistor are used. Further, the manufacturing apparatuses have a constitution provided with a plasma generating device for the purpose of high integration by microfabrication.

In these manufacturing processes, halogen-based corrosive gases such as fluorine-based gas and chlorine-based gas are used due to the high reactivity thereof as treatment gas in the apparatus described above. Examples of the fluorine-based gas may include $SF_6$, $CF_4$, $CHF_3$, $ClF_3$, HF, and $NF_3$, and examples of the chlorine-based gas may include $Cl_2$, $BCl_3$, HCl, $CCl_4$, and $SiCl_4$. When microwaves or high frequencies are introduced into the atmosphere into which these gases have been introduced, the gases are converted into plasma. The apparatus members exposed to these halogen-based gases or plasma thereof are required to have very few metals other than material components on the surface thereof and to have high corrosion resistance. Accordingly, an objective of the present disclosure is to provide an yttrium-based granular powder for thermal spraying for providing a thermal spray coating having excellent plasma resistance to coat a member for a plasma etching apparatus.

The yttrium-based granular powder for thermal spraying according to the present disclosure is a mixture including one or more yttrium compound powders selected from among Y2O3, YOF, YF3, Y4Al2O9, Y3Al5O12, and YAlO3, and a silica ($SiO_2$) powder. A Y—Si—O intermediate phase is included in a content of less than 10 wt %.

As constituent components of the yttrium compound powder for thermal spraying, any one or two or more selected from among Y2O3, YOF, YF3, Y4Al2O9, Y3Al5O12 and YAlO3 are contained, and a silica (SiO2) component is contained in addition to the yttrium-based compound. Accordingly, the melting point of the yttrium-based compound is reduced to suppress the formation of pores in a thermal spray coating during a process of manufacturing the thermal spray coating, which is advantageous for manufacturing a dense yttrium-based thermal spray coating having a low porosity. 90 to 99.9 mass % of the yttrium compound powder having an average diameter of 0.1 to 10 μm may be mixed with 0.1 to 10 mass % of the silica powder having an average diameter of 0.1 to 10 μm to manufacture the granular powder.

In the yttrium-based granular powder for thermal spraying, preferably, the yttrium compound is contained in a content of 90 to 99.9 mass %, and the silica is contained in a content of 0.1 to 10 mass %. More preferably, the content of the yttrium compound may be 95 to 99.5 mass %, and the content of the silica may be 0.5 to 5 mass %.

When the content of the silica is less than 0.1 mass %, the effect of reducing the melting point of the silica when the thermal spray coating is manufactured is insignificant. Further, when the content of the silica is more than about 10 mass %, the component to be lost in the form of silica (SiO2) is converted into the Y—Si—O intermediate phase and thus remains in an excessive amount in the thermal spray coating.

Since the boiling point of the silica is lower than the melting point of the yttrium compound, during the process of manufacturing the thermal spray coating of the present disclosure, some or all of the silica is vaporized while the yttrium-based granular powder for thermal spraying are liquefied and then scattered, thus imparting the effect of reducing the melting point of the yttrium-based granular powder for thermal spraying. The content of the silica remaining in the coating film according to the process of manufacturing the thermal spray coating is lowered compared to before the silica is input to the process of manufacturing the thermal spray coating.

Further, the average diameter of the yttrium compound powder selected from among Y2O3, YOF, YF3, Y4Al2O9, Y3Al5O12, and YAlO3, and the silica powder may be preferably 0.1 to 10 μm and more preferably 0.2 to 5 μm.

When the average diameter of the yttrium compound powder and the silica powder is less than about 0.1 μm, a Y—Si—O intermediate phase may be generated, and it may be difficult to control the powders, so it may be difficult to form powder of spherical granules and to adjust physical properties thereof. Further, when the average diameter of the yttrium compound powder and the silica powder as primary particles is more than about 10 μm, since the average diameter of the granular powder formed due to the agglomeration of the primary powders is very large, it may be difficult to form a uniform thermal spray coating.

Further, the deviation between the average diameter of the silica powder and the average diameter of the yttrium compound powder is preferably 30% or less. When the average diameter of the silica powder is greater than the average diameter of the yttrium compound powder by 30% or more, an excessive amount of Y—Si—O intermediate phase may be generated during formation of the coating.

Further, the size of the yttrium-based granular powder for thermal spraying according to the present disclosure may be 5 to 50 μm, preferably 10 to 40 μm, and more preferably 15 to 30 μm.

When the size of the yttrium-based granular powder for thermal spraying is less than 5 μm, it is not possible to implement a uniform film due to low flowability of the powder during thermal spray coating. Since the powder is oxidized before being delivered to a frame or the powder is not delivered to the center of the frame, it is difficult to meet the droplet flying speed and heat quantity for forming a dense film, so a film having high porosity or low hardness is formed. When the average diameter of the yttrium-based granular powder is more than 50 μm, the melt specific surface area of the granular powder is reduced, so that perfect melting is not achieved. Accordingly, an unmelted part is generated in the filmy coating, making it difficult to satisfy the quality of the thermal spray coating required in the present disclosure.

Further, the aspect ratio of the yttrium-based granular powder for thermal spraying of the present disclosure is expressed by the ratio of the long diameter to the short diameter of the granular powder, and from the viewpoint of forming a dense and uniform film, the aspect ratio is preferably 1.0 or more and 5.0 or less, more preferably 1.0 or more and 4.0 or less, and particularly preferably 1.0 or more and 1.5 or less.

Since the flowability of the yttrium-based granular powder for thermal spraying acts as an important factor in the quality of the thermal spray film, it is most preferable that the yttrium-based granular powder for thermal spraying be manufactured so as to have a spherical shape. Otherwise, since a predetermined amount of powder is not delivered to the frame when the thermal spray coating is manufactured, the desired film may not be formed.

For example, the silicon element may be partially vaporized in the process of manufacturing the thermal spray coating, and the weight ratio (Si/Y) of the silicon element to yttrium in the yttrium-based granular powder for thermal spraying may be 0.3 to 1.00.

For example, the yttrium-based particles for thermal spraying may include a Y—Si—O intermediate phase in a content of less than 10 wt %.

Further, the present disclosure provides a method of manufacturing an yttrium-based granular powder for thermal spraying. The method includes (a) mixing one or more yttrium compound powders selected from among Y2O3, YOF, YF3, Y4Al2O9, Y3Al5O12, and YAlO3 with a silica ($SiO_2$) powder to manufacture a mixture, (b) assembling the mixture to manufacture the granular powder, and (c) calcining the granular powder at 1200 to 1450° C. to obtain the yttrium-based granular powder for thermal spraying. The yttrium-based granular powder for thermal spraying includes a Y—Si—O intermediate phase in a content of less than 10 wt %.

Hereinafter, a method of manufacturing an yttrium-based granular powder for thermal spraying according to the present disclosure will be described in detail.

The flowability of the materials of one or more yttrium compound powders selected from among Y2O3, YOF, YF3, Y4Al2O9, Y3Al5O12, and YAlO3 and the silica ($SiO_2$) powder as primary materials does not meet the level required for thermal spraying. Therefore, it is preferable to manufacture the granular powder so that the granular powder have a spherical shape through mixing, assembling, and calcining processes.

In the mixing process of the step (a), a sintering aid and a dispersion medium are added to the materials of one or more yttrium compound powders selected from among Y2O3, YOF, YF3, Y4Al2O9, Y3Al5O12, and YAlO3 and the silica ($SiO_2$) powder, followed by mixing, thus obtaining a mixture. If necessary, the mixture is further mixed with a binder to manufacture slurry droplets.

The additional binder is preferably an organic compound, and may be an organic compound including carbon, hydrogen, and oxygen, or including carbon, hydrogen, oxygen, and nitrogen, for example, carboxymethylcellulose (CMC), polyvinyl alcohol (PVA), or polyvinylpyrrolidone (PVP), but is not limited thereto.

Thereafter, in the step (b), the mixture including the yttrium compound powder and the silica ($SiO_2$) powder undergoes an assembling process. As an assembling apparatus, for example, a spray drying apparatus may be used. In the spray drying apparatus, a slurry containing a plurality of pulverized particles is dropped in hot air, whereby the droplets are solidified to perform assembling, thus forming intermediate particles containing a plurality of particles.

Finally, in the step (c), the granular powders are subjected to a calcining step. It is preferable that a calcining temperature be 1200 to 1450° C. By performing the calcining in this temperature range, the yttrium compound powder and the silica ($SiO_2$) powder in the granular powder are physically bonded to each other.

A calcining time is preferably 2 hours or more and 8 hours or less under the condition that the calcining temperature is within the above range.

With respect to a calcining atmosphere, an oxygen-containing atmosphere such as the atmosphere may be used, but an inert gas atmosphere such as argon gas or a vacuum atmosphere is preferable.

Further, the present disclosure provides yttrium-based particles for thermal spraying manufactured using the method of manufacturing the yttrium-based particles for thermal spraying.

Further, in the present disclosure, the yttrium-based granular powder for thermal spraying may be thermally sprayed to manufacture an yttrium-based thermal spray coating formed on a substrate.

The thermal spraying may be any one of flame spraying, wire arc spraying, plasma spraying, vacuum plasma spraying, high-velocity oxygen fuel spraying (HVOF), low-temperature spraying, and explosive spraying.

The plasma spraying method includes a general coating method of adding a material for thermal spraying to a plasma jet and then performing heating and acceleration to deposit the material on a substrate, thus obtaining a thermal spray coating. Further, the plasma spraying method may be atmospheric plasma spraying (APS) performed in the atmosphere, low pressure plasma spraying (LPS) in which thermal spraying is performed under a pressure lower than the atmospheric pressure, or high pressure plasma spraying in which plasma spraying is performed in a pressurized container under a pressure higher than the atmospheric pressure.

According to this plasma spraying, for example, the thermal spray material may be melted and accelerated using a plasma jet of about 10000 to 15000 K, whereby the granular powder for thermal spraying may collide with the substrate at a speed of about 300 to 1000 m/s and then be deposited.

It is preferable that the conveying rate of the feeder conveyed using a spray unit be 10 to 30 g/min. When the conveying rate of the feeder is more than 30 g/min and thus the feed amount of the feeder powder conveyed for a unit time is very large, it is difficult to manufacture a uniform thermal spray coating, so a part of the feeder powder is not completely melted, which increases the porosity of the thermal spray coating. Further, when the conveying rate of the feeder is less than 10 g/min, the conveying rate of the feeder is insufficient, so the uniformity of the thermal spray coating is deteriorated due to the pulsation of the thermal spray coating and the production yield is reduced.

In the present disclosure, the substrate to be coated with the thermal spray coating is not particularly limited. For example, the material quality or shape of the substrate is not particularly limited as long as the substrate contains a material capable of being provided to thermal spraying of the material for thermal spraying to ensure desired resistance. Examples of the material constituting the substrate for thermal spraying are preferably selected from one or more combinations of aluminum, nickel, chromium, zinc, and alloys thereof, alumina, aluminum nitride, silicon nitride, silicon carbide, and quartz glass constituting a member for an apparatus of manufacturing semiconductors.

Such a substrate is, for example, a member constituting an apparatus for manufacturing semiconductor devices, and may be a member exposed to highly reactive oxygen gas plasma or halogen gas plasma.

Before the plasma spraying, the surface of the substrate is preferably treated in accordance with the work standard of thermal spraying of ceramics specified in JIS H 9302. For example, after rust or oils and fats from the surface of the substrate are removed, grinding particles such as $Al_2O_3$ and SiC are sprayed to perform roughening, and pre-treatment is performed so as to ensure a state where thermal spraying granular powder is easily attached.

Further, with respect to the method of manufacturing the thermal spray coating, in addition to the plasma spraying, the thermal spray material disclosed herein may be provided to a thermal spraying apparatus based on a known thermal spraying method, thus forming the thermal spray coating. Examples of the thermal spraying method for appropriately thermally spraying the material for thermal spraying include thermal spraying methods such as a high-velocity flame spraying method, a flame spraying method, and an explosive spraying method.

The characteristics of the thermal spray coating may depend to some extent on the thermal spraying method and the thermal spraying conditions thereof. However, regardless of which thermal spraying method and thermal spraying conditions are employed, it is possible to form a dense thermal spray coating having a lower porosity using the material for thermal spraying disclosed herein compared to the case of using other materials for thermal spraying.

While a conventional yttrium-based thermal spraying film has a high porosity in a coating layer thereof, in the present disclosure, the silica component is added as the primary powder to reduce the melting point of the yttrium-based compound, thus suppressing the formation of pores in the thermal spray coating during the process of manufacturing the thermal spray coating. The silica component is automatically lost in the high-temperature coating manufacturing process, thereby manufacturing a dense yttrium-based thermal spray coating having a low porosity.

For example, the yttrium-based thermal spray coating formed by the method of manufacturing the yttrium-based thermal spray coating may have a porosity of less than 2%, preferably less than 1.5%, and more preferably less than 1%.

Therefore, the yttrium-based thermal spray coating according to the present disclosure has a superior porosity compared to a conventional thermal spray coating, thus being applied to the semiconductor chamber used in a conventional etching process and exhibiting excellent durability, and the phenomenon that a coating material is detached by an etching gas is suppressed.

For example, in the method of manufacturing the yttrium-based thermal spray coating, the silicon element may be partially vaporized in the process of manufacturing the thermal spray coating, and thus the weight ratio (Si/Y) of the silicon element to the yttrium is in the range of 0.3 to 1.00.

Further, in the yttrium-based thermal spray coating according to the present disclosure, in the case where the yttrium compound is yttrium oxide (Y2O3), a monoclinic form may be included in an amount of 70 to 90% as the crystal structure of the yttrium oxide. It is interpreted that the monoclinic crystal structure of yttrium oxide (Y2O3) has the effect of increasing the bonding strength between yttrium oxide powders, contributing to the formation of small pores in the thermal spray coating.

Further, the yttrium-based thermal spray coating according to the present disclosure preferably does not contain a Y—Si—O intermediate phase, and may contain the Y—Si—O intermediate phase in an amount of at least less than 10 wt %.

When the Y—Si—O intermediate phase is generated in an amount of 10 wt % or more, the silicon element (Si) is reacted with a halogen-based corrosive gas to vaporize, due to this, the possibility of generating voids is increased, and process gases such as corrosive gases may penetrate along the generated voids to thus generate particles.

Further, as the Y—Si—O intermediate phase is generated, it is not possible to form a homogeneous film in the granular powder, which may cause a difference in the function of each part, thus causing difficulty in imparting the properties thereof.

Hereinafter, the present disclosure will be described in more detail through Examples. However, the following Examples only illustrate the present disclosure, and the present disclosure is not limited by the following Examples.

Preparation Examples 1 and 2

After an yttria powder and a silica powder were mixed with a binder, an assembled powder was obtained using a spray dryer. Thereafter, the assembled powder was degreased and then sintered to obtain a sintered powder. Experimental conditions such as the size and mixing ratio of the yttria powder and the silica powder used in each Preparation Example are shown in Table 1 below, and a scanning electron microscope (SEM) photograph of the manufactured granular

TABLE 1

| | Component | Size of granular powder (μm) | Mixing ratio of primary powders (wt %) | Mixing ratio in granular powder (wt %) |
|---|---|---|---|---|
| Preparation Example 1 | Y2O3 SiO$_2$ | 8.2 0.8 | 99.0 1.0 | Y: 65.93 Si: 1.45 O: 32.62 |
| Preparation Example 2 | Y2O3 SiO$_2$ | 0.7 0.8 | 99.0 1.0 | Y: 68.20 Si: 1.21 O: 30.58 |
| Preparation Example 3 | Y2O3 SiO$_2$ | 0.7 0.8 | 95.0 5.0 | Y: 70.02 Si: 5.35 O: 24.63 |
| Preparation Example 4 | Y2O3 SiO$_2$ | 0.7 0.8 | 90.0 10.0 | Y: 73.07 Si: 2.94 O: 23.99 |
| Preparation Example 5 | Y2O3 SiO$_2$ | 0.7 0.8 | 65.0 35.0 | Y: 55.54 Si: 12.41 O: 32.06 |
| Preparation Example 6 | Y2O3 SiO$_2$ | 0.7 0.8 | 50.0 50.0 | Y: 41.00 Si: 19.70 O: 39.29 |

Examples 1 to 8

Figure 1A:
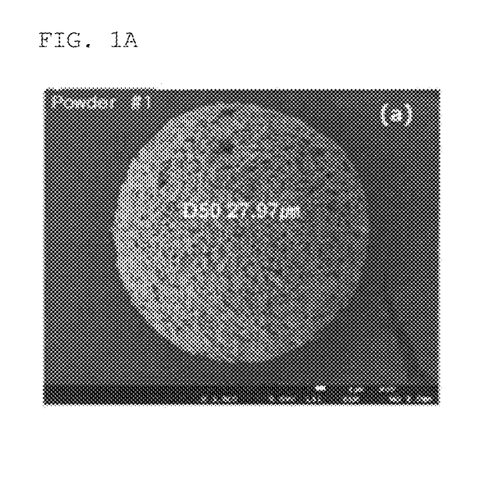
Figure 1B:
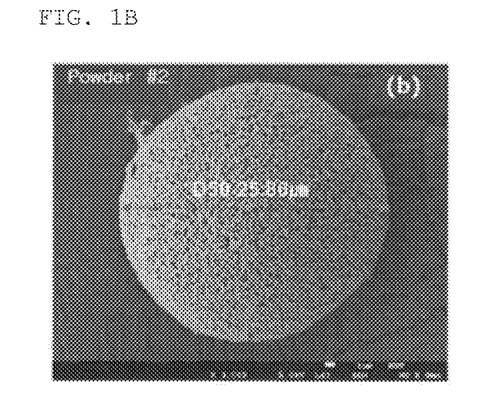
Figure 2A:
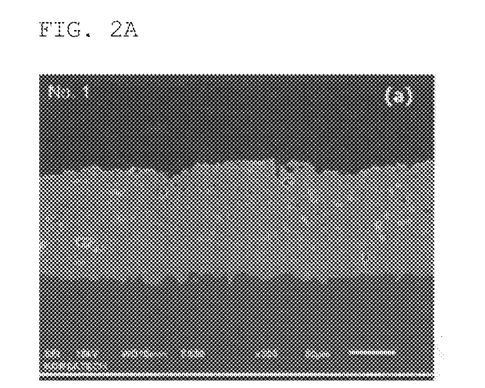
Figure 2B:
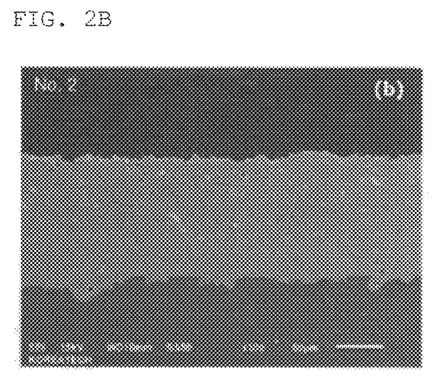
Figure 2C:
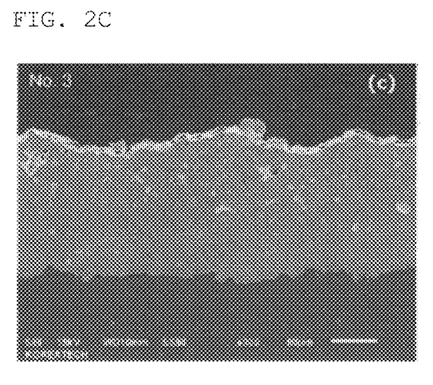
Figure 2D:
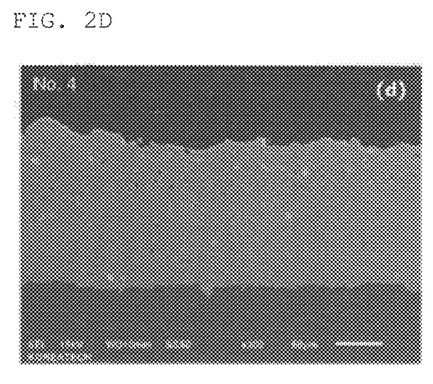

Raw material powder was melted using a plasma generated at a power of 40 to 50 kW while thermal spray materials prepared in Preparation Examples 1 and 4 and a plasma gun were used, argon and hydrogen gases were allowed to flow as heat source gases, and a thermal spraying gun was moved, thus forming a coating film on a mother material. The coating film was formed so as to have a thickness of 150 to 200 μm, and the experimental conditions are shown in Table 2 below. Further, a scanning electron microscope (SEM4) photograph of the side of the manufactured thermal spray coating is shown in FIG. 2 below.

TABLE 2

| Classification | Material | Plasma condition | | Feeder condition | |
|---|---|---|---|---|---|
| | | Ar (NLPM) | Electric current (A) | Feeder conveying speed (g/min) | Separation distance (mm) |
| Example 1 | Preparation Example 1 | 48 | 600 | 20 | 200 |
| Example 2 | Preparation Example 1 | 48 | 600 | 20 | 150 |
| Example 3 | Preparation Example 2 | 48 | 600 | 20 | 200 |
| Example 4 | Preparation Example 2 | 48 | 600 | 20 | 150 |
| Example 5 | Preparation Example 3 | 48 | 600 | 20 | 200 |
| Example 6 | Preparation Example 3 | 48 | 600 | 20 | 150 |
| Example 7 | Preparation Example 4 | 48 | 600 | 20 | 200 |
| Example 8 | Preparation Example 4 | 48 | 600 | 20 | 150 |

Comparative Examples 1 to 6

The size of the primary powder in the yttrium oxide granular powder used in Comparative Examples 1 and 2 below was 5 µm, the size of the yttrium oxide granular powder was 35 µm, and the mixing ratio of an yttrium element and an oxygen element in the yttrium oxide granular powder was 78/22.

A coating film was formed in the same manner as in the Examples using the yttrium oxide granular powder and the thermal spray materials prepared in Preparation Examples 5 and 6, and experimental conditions are shown in Table 3 below.

TABLE 3

| Classification | Material | Plasma condition | | Feeder condition | |
|---|---|---|---|---|---|
| | | Ar (NLPM) | Electric current (A) | Feeder conveying speed (g/min) | Separation distance (mm) |
| Comparative Example 1 | Y2O3 | 48 | 600 | 20 | 200 |
| Comparative Example 2 | Y2O3 | 48 | 600 | 20 | 150 |
| Comparative Example 3 | Preparation Example 5 | 48 | 600 | 20 | 200 |
| Comparative Example 4 | Preparation Example 5 | 48 | 600 | 20 | 150 |
| Comparative Example 5 | Preparation Example 6 | 48 | 600 | 20 | 200 |
| Comparative Example 6 | Preparation Example 6 | 48 | 600 | 20 | 150 |

Experimental Example 1: Observation of Thermal Spray Coating

FIG. 2 is a scanning electron microscope (SEM) photograph of sides of thermal spray coatings according to Examples 1 to 4 according to the present disclosure. From the scanning electron microscope (SEM) photograph of the sides of the thermal spray coatings of FIG. 2, it was confirmed that the thermal spray coating had a low porosity and that a dense thin film was formed.

Further, the porosity was measured as follows. That is, the thermal spray coating was cut so as to obtain a plane perpendicular to the surface of a substrate, the obtained cross section was polished to embed a resin, and then the image of the cross section was photographed using an electron microscope (JEOL, JS-6010) (FIG. 2). This image was interpreted using an image interpretation software (MEDIA CYBERNETICS, Image Pro) to thus specify the area of a pore portion in the cross-sectional image and calculate the ratio of the area of the pore portion to the shear surface, thereby obtaining the porosity through the area of the pores shown in the cross section of the thermal spray coating. The obtained porosity is shown in Table 4.

The porosity of the thermal spray coating manufactured in Comparative Example 1 and Comparative Example 2 was shown to have a value of 2% or more. However, Examples 1 to 4 all showed a porosity value of less than 1.5%, indicating that the density of the yttrium-based thermal spray coating according to the present disclosure was increased compared to that of a thermal spray coating having conventionally used compositions.

Figure 3A:
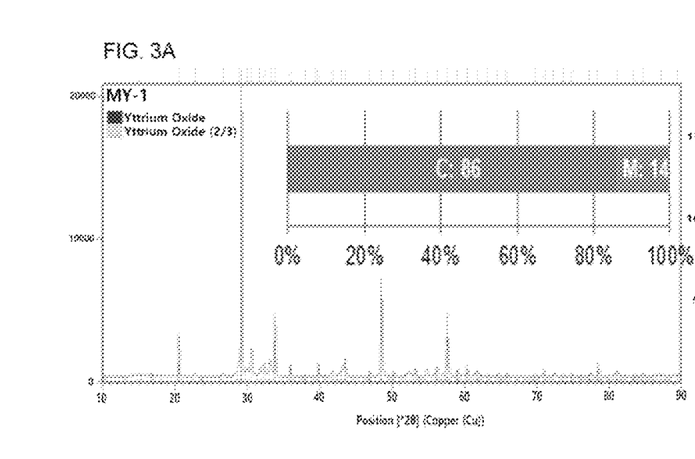
Figure 3B:
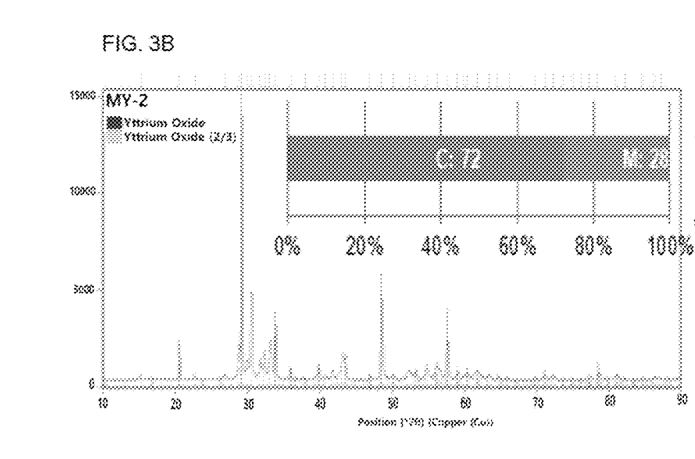
Figure 3C:
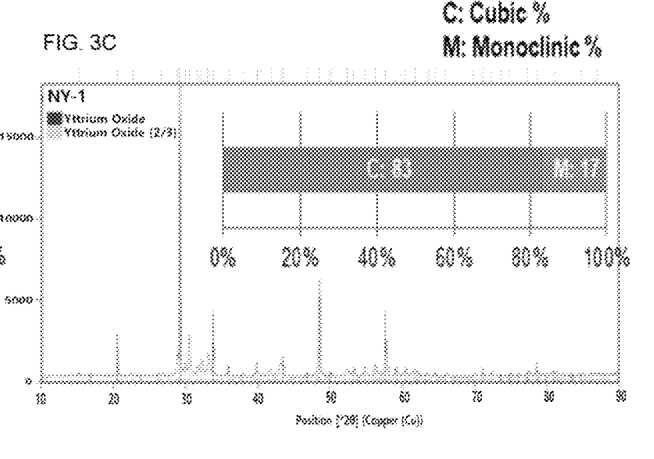
Figure 3D:
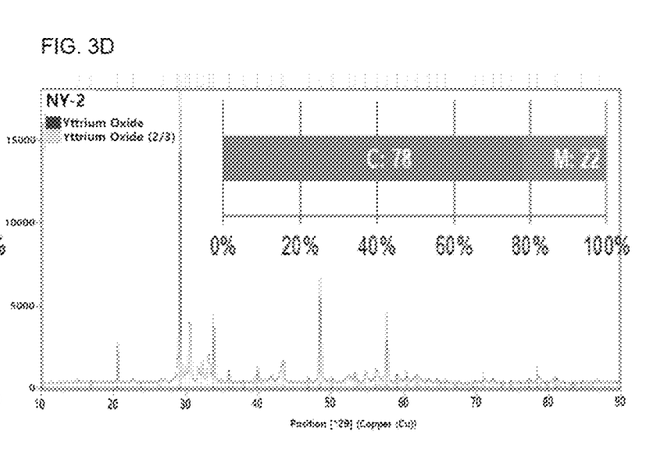
FIG. 3D shows the result of an X-ray diffraction analysis (XRD) of the thermal spray coatings according to (a) Example 1, (b) Example 2, (c) Example 3, and (d) Example 4 according to the present disclosure.

Further, as shown in FIG. 3 below, in the thermal spray coatings according to Examples 1 to 4, it was confirmed that a monoclinic crystal structure was present at a higher ratio compared to a cubic structure as a result of X-ray diffraction analysis (XRD) using a scanning electron microscope (SEM). It has been reported that yttria has an effect of increasing bonding strength between primary powders due to the presence of a monoclinic crystal structure thereof, and the porosity is predicted to be reduced depending on the crystal structure of yttria.

TABLE 4

| Classification | Component ratio of thermal spray coating | | | Measurement Data | | | |
|---|---|---|---|---|---|---|---|
| | Y | Si | O | Porosity (%) | Hardness (Hv) | Roughness rate (Ra, μms) | Deposition rate (μm/pass) |
| Example 1 | 78.35 | 0.55 | 21.10 | <1.5 | 400~450 | 4.6~5.3 | >10 |
| Example 2 | 78.51 | 0.62 | 20.87 | <1.0 | 400~450 | 3.2~3.9 | >9 |
| Example 3 | 77.37 | 0.53 | 22.09 | <1.0 | 400~450 | 4.7~5.5 | >10 |
| Example 4 | 77.91 | 0.55 | 21.51 | <1.0 | 450~500 | 3.1~3.7 | >10 |
| Example 5 | 76.35 | 1.22 | 22.43 | <1.0 | 400~450 | 3.8~4.1 | 8.9 |
| Example 6 | 75.42 | 1.32 | 23.26 | <1.0 | 400~450 | 3.3~3.7 | 6.6 |
| Example 7 | 72.41 | 2.97 | 24.62 | <1.5 | 400~450 | 3.6~4.0 | 9.2 |
| Example 8 | 73.44 | 3.12 | 23.44 | <1.5 | 400~450 | 3.2~4.0 | 6.7 |
| Comparative Example 3 | 54.72 | 13.32 | 31.96 | <2.5 | 350~400 | 3.7~4.3 | 8.9 |
| Comparative Example 4 | 53.61 | 12.80 | 33.59 | <2.5 | 350~400 | 4.7~4.9 | 6.3 |
| Comparative Example 5 | 39.86 | 20.08 | 40.06 | <3.5 | 300~350 | 4.8~5.5 | 10.6 |
| Comparative Example 6 | 39.63 | 19.47 | 40.90 | <3.5 | 300~350 | 4.6~5.3 | 8.3 |
| Comparative Example 1 | | | | 3.5~5.0 | 400~450 | 3.5~5.5 | 2.5~3.5 |
| Comparative Example 2 | | | | 2.0~2.5 | 500~550 | 5~7 | 5~6 |

Experimental Example 2: Measurement of Hardness

The column of [Hardness] in Table 4 shows the measurement result of Vickers hardness of each thermal spray coating. The Vickers hardness was measured using a micro hardness measuring instrument (Company name, model name) and is a Vickers hardness (Hv0.2) obtained when a test force of 294.2 mN is applied with a diamond indenter at a facing angle of 136°.

As shown in Table 2, it was confirmed that the thermal spray coatings of Examples 1 to 4 exhibited a harness range similar to the hardness of the thermal spray coatings of Comparative Examples 1 and 2.

Experimental Example 3: Measurement of Roughness

The surface roughness (μm) of the coating films manufactured in the Examples and the Comparative Examples of the present disclosure was measured using a roughness meter (SJ-201), and the results are described in Table 4 above.

Experimental Example 4: Measurement of Deposition Rate

The thickness of the coating films manufactured in the Examples and the Comparative Examples of the present disclosure was observed using a cross-sectional SEM image, and the value obtained by dividing the thickness by the number of coatings performed is shown in Table 4 above.

Although a specific part of the content of the present disclosure has been described in detail, it will be apparent to those skilled in the art that these specific descriptions are merely preferred embodiments, and the scope of the present disclosure is not limited thereby. Accordingly, it is intended that the substantial scope of the present disclosure be defined by the appended claims and their equivalents.

What is claimed is:

1. An yttrium-based granular powder for thermal spraying, the yttrium-based granular powder comprising:
   one or more yttrium compound powders selected from among $Y_2O_3$, YOF, $YF_3$, $Y_4Al_2O_9$, $Y_3Al_5O_{12}$, and $YAlO_3$;
   a silica ($SiO_2$) powder; and
   a Y—Si—O intermediate phase,
   wherein
   an average diameter of the granular powder is 5 to 50 μm,
   the Y—Si—O intermediate phase is included in a content of more than 0 wt % and less than 10 wt %, and
   a weight ratio (Si/Y) of a silicon element to an yttrium element is 0.3 to 1.00.

2. The yttrium-based granular powder for thermal spraying of claim 1, wherein 90 to 99.9 mass % of the yttrium compound powder having an average diameter of 0.1 to 10 μm is mixed with 0.1 to 10 mass % of the silica powder having an average diameter of 0.1 to 10 μm to manufacture the granular powder.

3. A method of manufacturing an yttrium-based granular powder for thermal spraying, the method comprising:
   (a) mixing one or more yttrium compound powders selected from among $Y_2O_3$, YOF, $YF_3$, $Y_4Al_2O_9$, $Y_3Al_5O_{12}$, and $YAlO_3$ with a silica ($SiO_2$) powder to manufacture a mixture;
   (b) assembling the mixture to form a granular powder; and
   (c) calcining the granular powder at 1200 to 1450° C. to form a yttrium-based granular powder for thermal spraying,
   wherein
   the yttrium-based granular powder includes a Y—Si—O intermediate phase in a content of more than 0 wt % and less than 10 wt % and has an average diameter of 5 to 50 μm, and
   a weight ratio (Si/Y) of a silicon element to an yttrium element is 0.3 to 1.00.

4. Yttrium-based particles for thermal spraying manufactured using the manufacturing method of claim 3.

5. A method of manufacturing an yttrium-based thermal spray coating described in claim 4, wherein the silicon element is partially vaporized during a process of manufacturing the thermal spray coating using the yttrium-based particles.

* * * * *